United States Patent [19]

McCown

[11] 3,995,085

[45] Nov. 30, 1976

[54] FABRICS TREATED WITH HYBRID TETRACOPOLYMERS AND PROCESS

[75] Inventor: Joseph Dana McCown, Maplewood, Minn.

[73] Assignee: Minnesota Mining and Manufacturing Company, St. Paul, Minn.

[22] Filed: Dec. 4, 1975

[21] Appl. No.: 637,814

Related U.S. Application Data

[62] Division of Ser. No. 487,606, July 11, 1974, Pat. No. 3,944,527.

[52] U.S. Cl. ................................ 428/262; 427/389; 427/390 E; 427/392; 428/264; 428/265; 428/270; 428/272; 428/274; 428/290
[51] Int. Cl.² ................. D06M 15/38; D06M 15/68
[58] Field of Search .................... 427/389, 390, 392; 428/262, 264, 265, 270, 272, 274, 290

[56] References Cited
UNITED STATES PATENTS

| | | |
|---|---|---|
| 3,356,628 | 12/1967 | Smith et al. ...................... 428/270 X |
| 3,574,791 | 4/1971 | Sherman et al. ...................... 260/884 |
| 3,598,515 | 8/1971 | Moore et al. ................... 427/390 X |
| 3,869,465 | 3/1975 | Waldmann ...................... 427/390 X |

*Primary Examiner*—James R. Hoffman
*Attorney, Agent, or Firm*—Alexander, Sell, Steldt & Delahunt

[57] ABSTRACT

A new class of hybrid copolymers which confer improved spray rating, resistance to staining, particularly aqueous stains and improved resistance to crocking on surfaces is obtained from (I) fluoroaliphatic radical-containing component in combination with (II) hydrocarbyl radical-containing component together conferring controlled oleophobicity and hydrophobicity in air and (III) a balanced combination of hydrophilic components conferring oleophobicity in water.

4 Claims, No Drawings

FABRICS TREATED WITH HYBRID TETRACOPOLYMERS AND PROCESS

This is a division of application Ser. No. 487,606, filed July 11, 1974, now U.S. Pat. No. 3,944,527.

This invention relates to a new class of hybrid copolymers and more particularly to the class of hybrid copolymers consisting essentially of fluoroaliphatic radical containing acrylates or methacrylates, lower alkyl acrylates or methacrylates and at least two polyalkyleneoxide acrylates or methacrylates, one of which is a polyethylene glycol acrylate or methacrylate and another of which is either polyoxypropylene or polyoxytetramethylene acrylate or methacrylate.

For many years the public has been accustomed to purchasing fabrics or garments prepared solely from natural cellulosic or proteinaceous fibres (e.g. linen, cotton, wool, silk, etc.) to which various sizing, softening and/or repellency enhancing additives have been applied to provide improved characteristics. As a result, it has become the practice to add one or more complementary materials which compensate for the imperfections of the various additives. For example, crease-resistant resins added to fabrics consisting wholly or partially of cellulosic fibres provide enhanced appearance and minimize ironing, but at the same time, the fabric is found to be more receptive to stains, particularly oily stains, and release of these stains during cleaning, especially laundering, is found to be extremely difficult. Supplementing the fabric finish with a resin containing fluoroaliphatic radicals confers a high degree of water and oil repellency to the fabric and reduces the tendency to accept stains. However, once the fabric is stained by oily materials from ground-in soil, release during laundering became even more difficult.

Hybrid copolymers containing blocks or segments of both fluoroaliphatic radicals and hydrophilic moieties have been described in U.S. Pat. Nos. 3,574,791 and 3,728,151. The copolymers provide finished fabrics that resist both oily and aqueous staining and still permit ready release of ground-in oily stains during laundering. Fabrics so finished have proven very useful and desirable but, as may be expected, because the optimum balance of properties involves a compromise, certain characteristics of the finish suffer and fall short of the most desirable overall combination of properties. Thus, the presence of the hydrophilic moiety, necessary for release of stains, at the same time results in lower water resistance than in the unmodified polymer lacking such moieties. Hydrophilic components based on polyethyleneoxide also increase the tendency toward "crocking", that is, the transfer of dyes, especially in the case of darker, colored fabrics, upon being rubbed.

It is an object of this invention to provide hybrid copolymers having improved properties. A further object of the invention is to provide fabrics having improved water repellency while retaining oleophobicity in air and during laundering. A still further object of the invention is to provide colored fabrics having resistance to crocking while retaining desirable oleophobicity in air and during laundering. Other objects of the invention will become evident hereinelsewhere.

In accordance with the above and other objects of the invention, it has now been found that novel hybrid copolymers which may or may not be block or segmented copolymers are obtained by copolymerizations, as will become evident hereinafter, which copolymers conferring stain repellency and soil release on surfaces coated therewith are obtained from (I) fluoroaliphatic radical containing component in combination with (II) hydrocarbyl radical containing component, together conferring controlled olephobicity and hydrophobicity in air, and (III) a balanced combination of hydrophilic components conferring oleophobicity in water. A presently preferred group of these copolymers consists essentially, in percent by weight, of 40 to 70% fluoroaliphatic radical containing acrylate or methacrylate, 5 to 15% lower alkyl acrylate or methacrylate and a balance of at least two hydrophilic polyoxyalkylene acrylates or methacrylates, one of which is polyoxyethylene acrylate or methacrylate amounting to 20 to 30% of the tetrapolymer and another of which is polyoxypropylene or polyoxytetramethylene acrylate or methacrylate amounting to 5 to 15% of the tetracopolymer.

Other novel hybrid copolymers of the invention can be made by condensation or addition polymerizations of any conventional polymerizeable groups, e.g. isocyanates, oxiranes, esters, vinyl ethers and the like.

The novel hybrid copolymers of the invention are valuable for treatment of fabrics and provide an improved balance of properties. They provide stain repellency and soil release, with good resistance to crocking. Furthermore, at a given level of soil release, these copolymers provide higher levels of spray rating than was possible with heretofore available copolymers. When the novel copolymers are employed in conjunction with known fluoroaliphatic radical containing polymers devoid of polyoxyalkylene groups, still further enhanced stain repellency is obtained without significant decrease in soil release.

These novel polymers can be applied from aqueous or non-aqueous solutions or suspension by any of the customary procedures to natural or synthetic fibres such as polyester, cotton, linen, wool and combinations thereof, and they can be used in conjunction with many of the usual finishing aids, although care must be taken to avoid unduly large amounts of additives that are known to absorb oil, such as certain polyethylene-based softeners and acrylic-based hand modifiers. Such precautions are well known to fabric finishers and are customarily evaluated in small-scale or laboratory testing prior to commercial application.

As stated above, the hybrid copolymers of the invention comprise as a principal component a fluoroaliphatic radical containing acrylate or methacrylate. Suitable monomers are available, for example, among the many described in the patents listed in Table 1. Generically, such monomers are termed fluoroaliphatic vinyl monomers, fluoroaliphatic acrylates or fluoroaliphatic acrylates or methacrylates. It is essential that the monomer contain a fluoroaliphatic radical terminating in a $CF_3$ group. The fluoroaliphatic radical should contain at least three fully fluorinated carbon atoms which may or may not contain the terminal $CF_3$. A perfluoralkyl group, $C_nF_{2n+1}$, is preferred when $n$ is 3 to 20. The monomer should contain at least 25% by weight of fluorine in the form of fluoroaliphatic radicals and preferably at least 30% and up to as much as 60%. The fluoroaliphatic-radical containing monomer provides oil repellency in air and assists in stain and soil release during laundering.

Table 1

| Inventors | U.S. Pat. No. | Title |
| --- | --- | --- |
| Ahlbrecht, Reid and Husted | 2,642,416 | Fluorinated Acrylates and Polymers |
| Ahlbrecht, Brown and Smith | 2,803,615 | Fluorocarbon Acrylate and Methacrylate Esters and Polymers |
| Bovey and Abere | 2,826,564 | Fluorinated Acrylate and Polymers |
| Ahlbrecht and Smith | 3,102,103 | Perfluoroalkyl Acrylate Polymers and Process of Producing a Latex thereof |
| Johnson and Raynolds | 3,256,230 | Polymeric Water and Oil Repellents |
| Johnson and Raynolds | 3,256,231 | Polymeric Water and Oil Repellents |
| Fasick and Raynolds | 3,282,905 | Fluorine Containing Esters and Polymers thereof |
| Smith and Sherman | 3,329,661 | Compositions and Treated Articles thereof |
| Smith and Sherman | 3,356,628 | Copolymers of Perfluoro Acrylates, Hydroxy Alkyl Acrylates |
| Faran and Gilbert | 3,407,183 | Acrylate and Methacrylate Esters and Polymers thereof |
| Kleiner | 3,412,179 | Polymers of Acrylyl Perfluorohydroxamates |
| Pacini | 3,445,491 | Perfluoroalkylamido-alkylthio Methacrylates and Acrylates and Intermediates therefor |
| Eygen and Carpentier | 3,470,124 | New Fluorinated Compounds and Their Preparation |
| Brace | 3,544,537 | Poly(perfluoroalkoxy)-polyfluoroalkylacrylate-type Esters and Their Polymers |

The fluoroaliphatic radical is fluorinated, saturated, monovalent, non-aromatic aliphatic radical of at least 3 carbon atoms. The chain may be straight, branched or, if sufficiently large, cyclic, and may be interrupted by divalent oxygen atoms or trivalent nitrogen atoms bonded only to carbon atoms. Preferably the chain of the fluoroaliphatic radical does not contain more than one nitrogen atom for every two carbon atoms in the skeletal chain. A fully fluorinated group devoid of hydrogen atoms is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. "Terminal" in this connection refers to the position in the skeletal chain of the radical which is furthest removed from the backbone chain of the segment. Preferably the fluoroaliphatic radical contains not more than 20 carbon atoms because such a large radical results in inefficient use of the fluorine content.

More particularly, suitable fluoroaliphatic radical-containing acrylate monomers include:

$(C_3F_7)_3CCH_2O_2CCH=CH_2$ $C_3F_7SO_2N(C_3H_7)C_2H_4O_2CC(CH_3)=CH_2$ $C_8F_{17}(CH_2)_3O_2CCH=CH_2$ $C_8F_{17}COCH_2CH_2CH_2O_2CCH=CH_2$ $C_8F_{17}(CH_2)_{11}O_2CC(CH_3)=CH_2$ $C_8F_{17}SO_2CH_2CH_2O_2CCH=CH_2$ $C_8F_{17}SOCH_2CH_2O_2CCH=CH_2$ $C_8F_{17}SON(C_2H_5)(CH_2)_2O_2CC(CH_3)=CH_2$ $C_{11}F_{23}SO_2NH(CH_2)_{11}O_2CC(CH_3)=CH_2$ $CF_3C(CF_2H)F(CF_2)_{10}CH_2O_2CCH=CH_2$ $CF_3C(CF_2Cl)F(CF_2)_{10}(CH_2)_2O_2CCH=CH_2$ $C_8F_{17}SO_2N(CH_3)CH_2O_2CC(CH_3)=CH_2$ $C_3F_6(OCF_2CF_2)_6OCF_2CF_2CON(CH_3)CH_2CH_2O_2CCH=CH_2$ $(C_4F_9CO)_2NCH_2CH_2O_2CC(CH_3)=CH_2$

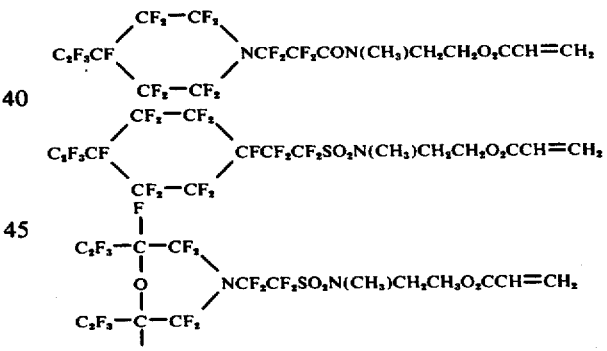

The above and their equivalents are employed with lower alkyl acrylates or methacrylates.

The second component in the hybrid tetracopolymers of the invention is a lower alkyl acrylate or methacrylate. $C_mH_{2m+1}O_2CC(X)=CH_2$ where $m$ is 1–4 and X is H or $CH_3$, used in an amount of 5–15% by weight of the monomer mixture. This component is found to improve the water repellency of the treated fabric and to improve the flow characteristics and hence coating characteristics of the tetrapolymer. More than about 15% tends to reduce the oil repellency of the product excessively as does also the use of monomers in which the lower alkyl group is greater than 4 carbon atoms in length. The length of the alkyl chain must be short. Although butyl acrylate is useful, it is preferred that chains of no more than three carbon atoms be present. Preferred monomers include alkyl acrylates or methacrylates wherein the alkyl is methyl, ethyl, propyl or isopropyl.

The hydrophilic portion of the molecules of the hybrid copolymers of the invention is made up of a relatively limited group of polyoxyalkylene acrylates or methacrylates (sometimes written as (meth)acrylates) in a total amount of 25 to 45% by weight of the copolymer.

The third component is a polyoxyethylene (meth)acrylate which provides hydrophilic characteristics which are required for soil-release during laundering. The average molecular weight of the polyoxyethylene chain can suitably vary from about 2,000 to about 6,000. The starting material may be polyoxyethylene diol or mono alkyl ether thereof. Preferably a diol is used which is 30 to 50% esterified by (meth)acrylic acid. This component is generally a mixture of diol or mono alkyl ether thereof, mono and di-esters and can be represented on the average by the general formula

where X has its previous meaning of H or $CH_3$, q is about 50 to about 150 and Y is H or lower alkyl $C_mH_{2m+1}$ as above defined. Only occasional molecules will occur in which Y is

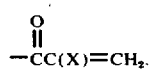

Such esters are readily prepared as described in U.S. Pat. No. 3,574,791, Example 19. When there is less than 30% esterification, and undesirable large fraction of free polyoxyethylene diol remains, which may be lost when treated fabric is laundered. Above about 50% esterification tends to give an undesirable level of crosslinking in the tetrapolymer product.

The relative amount of polyoxyethylene acrylate or methacrylate in the tetrapolymer is important. Less than about 20% by weight fails to give adequate hydrophilicity in the product and soil release tends to be unsatisfactory. Using more than about 30% of the polyoxyethylene acrylate or methacrylate results in a product which tends, in addition to promoting crocking, to be receptive to water-borne stains, i.e. to have insufficient water-repellency for satisfactory performance.

The fourth component needed for hybrid copolymers of the invention is a polyoxypropylene or polyoxytetramethylene acrylate and methacrylate. This component in combination with the above polyoxyethylene acrylate or methacrylate provides a balance of hydrophilicity in the polymer and thus permits attainment of adequate hydrophilicity during laundering without undue water sensitivity and with minimum tendency toward crocking by substituting in part for the polyoxyethylene component that would otherwise be required. Additionally, it is found that inclusion of this component provides improved oil repellency to the coated fabric, perhaps by providing increased flexibility to the polymer and thereby improving the orientation on the fabric surface.

The polyoxytetramethylene diol average molecular weight can vary from about 750 to about 4,000. The material available commercially as Polymeg 2,000 (tradename product of the Quaker Oats Company) is suitable. Esterification of from 50 to 90% and preferably 75% with acrylic or methacrylic acid by essentially conventional procedures provides a useful acrylate component. It is advantageous to stop the esterification at an intermediate stage to avoid formation of too much bis ester. This component of the tetracopolymer of the invention is generally a mixture of the diol, mono and diesters and can be represented on the average by the general formula

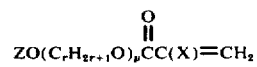

wherein $r$ is 3 or 4, X is H or $CH_3$, $p$ is about 10 to about 35, and Z is H or

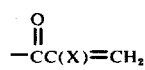

The following brief description illustrates the general procedure used for preparing this component: 260 parts of commercial Polymeg 2,000 is placed in a vessel with 221 parts of toluene and to it are added 0.25 parts hydroquinone dimethyl ether, 0.13 parts of phenothiazine, 22.1 parts of methacrylic acid and 2.6 parts of toluene sulfonic acid. Refluxing of the mixture is continued until an aliquot is shown by titration to contain 0.15 to 0.16 milliequivalents of acid per gram. The mixture is cooled and 2.2 parts of calcium hydroxide added. Agitation is continued for about one half hour and the mixture is then filtered (using filter aid if needed) to remove precipitates. Solvent is then removed under reduced pressure and the residual ester containing phenothiazine and hydroquinone dimethyl ether is recovered. The degree of esterification is calculated by dividing the saponification equivalent of the isolated product by the hydroxyl equivalent weight of the starting diol.

The tetrapolymer of the invention is obtained by polymerization procedures. Solvent polymerization has been found most useful. Any of the conventional neutral solvents are suitable, such as toluene, xylene, methylisobutylketone, ethyl acetate, 1,1,1-trichloroethane and the like.

Any conventional free-radical catalysts which is soluble in the solvent system can be used. Particularly preferred are azo compounds such as azobisisobutyronitrile and peroxides such as t-butyl-hydroperoxide. Catalyst concentration is suitably 0.1 to 2 percent of the charge.

Conventional chain transfer agents, such as octyl mercaptan, can be used in amounts of 0.25 – 3% by the weight of monomer to control the molecular weight of the polymer product. This is particularly desirable when a significant amount of diacrylate is present in the formulation, i.e., when the diol moieties average over 50% esterification. Lower amounts are used when there is a low degree of esterification of the monomers. Higher amounts tend to decrease durability and oil repellency of the treatment.

Total polymer solids as high as 50% or more can be obtained in the reaction mixture, although solids contents of 10–40% are usually of more suitable viscosity.

The product tetrapolymer of the invention can be converted to an aqueous latex, for example, by polymerization in a water-miscible solvent followed by mixing the solution with water under strong agitation or high shear. Usually, the addition to the water of 0.5 – 5% of an emulsifier is desirable. Exemplar emulsifiers include polyoxyethylated alkyl phenol, quaternary alkyl ammonium salts, fluoroaliphatic sulfonates, or mixtures thereof. If desired, a water immiscible solent such as ethyl acetate can be used and subsequently be removed from the mechanically-formed latex by volatilization.

The product hybrid tetrapolymer, in the form of a solution or latex, can be applied to fabric by conventional means, such as spray, pad, or roll-coater to provide a treated fabric which, after drying, has resistance to oily or aqueous stains, and which releases ground-in soils or stains during laundering. Additionally, fabrics dyed to keep tones are found to be much more resistant to transfer or dyes by rubbing (crocking) than is the case of fabrics treated with previously described hybrid fabric treating compositions in which hydrophilicity depended primarily on the use of a polyoxyethylene-based component.

For certain purposes, a polymeric fabric treatment would be desirable which improved the oil and water resistance imparted by the product polymer without the sacrifice of soil-release properties which results when the fluoroaliphatic radical content of the described tetrapolymer is increased. It has been found that such an improvement can be obtained by blending a tetrapolymer of the invention with a conventional oil and water repellent fluoroaliphatic radical containing polymer devoid of polyoxyalkylene groups, either as homopolymer or copolymer with a fluorine-free monomer. Suitable polymers and copolymers include, for example, those described above in Table 1 as well as fluoroaliphatic radical containing polyurethanes or carbodiimides (see, for example, DOS No. 2,310,801) and the like. Acrylate and methacrylate polymers and copolymers containing 30 to 60% by weight of fluorine in the form of fluoroaliphatic radical are particularly preferred. While solutions or suspensions of the two systems are useful, the polymers are generally insoluble in inexpensive solvents, and mixtures of aqueous latices are more convenient for those applications in which water can be tolerated.

The ratio of fluoroaliphatic polymer devoid of polyoxyalkylene groups to soil-releasing hybrid tetracopolymer of the invention is not critical, providing at least about 20% by weight of the hydrophilic tetracopolymer is present in the mixture to provide sufficient soil releasing characteristic. Ratios of 80:20 to 20:80 are found to be useful. The resulting polymeric blend should contain at least about 25% by weight of carbon-bonded fluorine in the form of fluoroaliphatic radical. The treated fabric will generally have polymer deposited thereon to provide carbon-bonded fluorine content of 0.02 to 1% by weight of treated fabric, usually 0.05 to 0.5%.

Now, having described the invention broadly, it is more specifically illustrated by examples showing how the invention is practiced and the best mode presently contemplated practicing the invention.

EXAMPLE 1

A tetrapolymer of the invention is prepared as follows: In a suitable size sealable container, e.g. a bottle of about 115 ml. capacity are combined:

12.0 gm of N-methyl perfluorooctanesulfonamidobutyl acrylate
2.0 gm ethyl acrylate
4.0 gm of 40% esterified polyoxyethylene methacrylate (M.W. 4000)
2.0 gm of 75% esterified polyoxytetramethylene methacrylate (M.W. 2000)
20.0 gm of ethyl acetate
0.15 gm of azobisisobutyronitrile
0.4 gm of octyl mercaptan The bottle is flushed with nitrogen and sealed and is then agitated at 65° C for 16 hours. The polymer solution contains 50.5% solids and is emulsified in water using approximately 0.5 g (2.5% of polymer solids) of perfluorooctanesulfonamidopropyl trimethyl ammonium chloride to give an aqueous emulsion containing 15.3% solids.

A textile treating solution of dispersion designated Solution A is prepared to contain 0.26% of the above tetrapolymer, 0.17% of the 95:5 copolymer of N-methyl perfluorooctanesulfonamidoethyl acrylate and butyl acrylate, 10% of a commercially available permanent press resin believed to be a cyclic compound of dimethylol ethylene urea (available as Permapress L F in 45% solution from Sun Chemical Co.) and 2 of 20% solids zinc nitrate catalyst (Catalyst X-4 from Sun Chemical Co.) The solution is applied at 70% wet pickup to 50/50 cotton/linen and 100 percent cotton fabric and designated fabrics A and B from an aqueous pad bath and the fabric is dried at 150° C for 10 minutes. A comparison treating bath designated Solution B is made using, in place of the two polymers used above, 0.43% solids of a hybrid copolymer prepared according to Example 19 of U.S. Pat. No. 3,574,791 using polyoxyethylene dimethacrylate having saponification equivalent 1300 and molecular weight 4000. Solution B is a similar bath to solution A and cloth samples are treated similarly.

Standard tests are employed in the evaluation of the treated fabric samples which are conveniently designated by the combination of letters for the treating solution and the fabric, i.e. AB, BA, AA and BB. Repeated tests using the same combination are designated by adding a number, e.g. AA-1, AA-2, etc. Standard tests are provided by the American Association of Textile Chemists and Colorists (AATCC) Technical Manual available from the Association office, P.O. Box 72215, Research Triangle Park, N.C. 27709. The following tests are from the 1970 Manual are employed herein:

| Oil Rating | Test No. 118–66 |
|---|---|
| Water Repellency | Test No. 22–67 |
| Soil Release | Test No. 130–69 |
| Crocking | Test No. 8–69 |

Tests for stain release and staining are carried out as described in U.S. Pat. No. 3,574,791, Columns 14 and 15 and are here incorporated by reference. The data are displayed in Table 2. The figures for Nujol release refer to staining as described in U.S. Pat. No. 3,574,791 for corn oil but using Nujol (mineral oil) using the visual method of observation for rating.

Table 2

| Sample | Initial Properties | | | | Properties after 5 launderings | | | |
|---|---|---|---|---|---|---|---|---|
| | Oil rating | Spray rating | Nujol Release Trial 1 | Trial 2 | Oil rating | Spray rating | Nujol Release Trial 1 | Trial 2 |
| AA-1 | 6.0 | 80 | 4.5 | 4.0 | 2.5 | 50 | 4.0 | 4.5 |
| AA-2 | 6.5 | 85 | 3.0 | 3.0 | 2.0 | 50 | 4.0 | 4.0 |
| AB | 6.0 | 90 | 4.5 | 5.0 | 2.0 | 50 | 4.5 | 4.5 |
| BA-1 | 3.0 | 50 | 4.5 | 4.0 | 0 | 0 | 3.5 | 4.0 |
| BA-2 | 3.0 | 50 | 3.5 | 4.0 | 0 | 0 | 3.5 | 4.0 |
| BB | 3.0 | 50 | 4.5 | 5.0 | 0 | 0 | 4.5 | 4.0 |

It will be seen that initial values and retention of oil and water repellency (oil and spray ratings) are significantly better using polymers of the invention.

EXAMPLE 2

The procedure of Example 1 is repeated to produce three tetrapolymers of the invention substituting $CH_3CCl_3$ for the 20 gm. ethyl acetate used in that example in amounts of 80 g., 40 g. and 30 g. The tetrapolymers of the invention are designated C, D and E respectively. They are applied to 100% polyester fabrics as dilute solutions in trichloroethane in amounts to give 0.2% polymer solids on the fabric and then dried at 120° C for 3 minutes. The results are similar to those of Example 1 in that the tetrapolymers of the invention are found to confer higher initial repellency and soil release and better retention of repellency and stain release after five launderings than does the above copolymer designated B. They also provide greater resistance to crocking.

EXAMPLE 3

A series of tetrapolymers is made by the general procedure of Example 1 using various ingredients in the percentages tabulated for the tetrapolymers designated F through L. In each case, the solvent is ethyl acetate; 0.15 g. azobisisobutyronitrile and 0.4 g. octyl mercaptan are used.

Table 3

| Ingredient/Polymer | F | G | H | I | J | K | L |
|---|---|---|---|---|---|---|---|
| N-Methyl perfluorooctane-sulfonamidobutyl acrylate | 60 | 60 | 60 | 60 | 60 | — | 60 |
| N-Butyl perfluorooctane-sulfonamido ethyl acrylate | — | — | — | — | — | 60 | — |
| Ethyl acrylate | — | — | — | 10 | 10 | 10 | 10 |
| Butyl acrylate | 10 | — | — | — | — | — | — |
| 2-Ethylhexyl acrylate | — | 10 | — | — | — | — | — |
| Octadecyl acrylate | — | — | 10 | — | — | — | — |
| Polyoxyethylene (MW 4000) methacrylate, 40% esterified | 20 | 20 | 20 | — | 20 | 20 | 20 |
| Polytetramethylene oxide (MW 2000) methacrylate, 75% esterified | 10 | 10 | 10 | 10 | — | 10 | 10 |
| Polyoxypropylene (MW 1000) acrylate, 70% esterified | — | — | — | — | 10 | — | — |

The several polymers are applied to four different colored 100% polyester fabrics (6 to 9 ounces per square yard, double knit and woven) as in Example 2 as dilute solutions in trichloroethane.

Swatches are rated according to the test noted above for oil and spray rating before and after 5 launderings, wet and dry crocking, and stain release to mineral oil (Nujol) and salad oil (Wesson). The averages of the ratings on the four swatches for each test, and for the eight swatches used for the two stain release tests are tabulated in Table 4 in which OR, SR and SS represent oil and spray ratings and stain release respectively.

Table 4

| Polymer | Crock | | Initial | | | After 5 launderings | | |
|---|---|---|---|---|---|---|---|---|
| | Dry | Wet | OR | SR | SS | OR | SR | SS |
| F | 4.4 | 3.8 | 6.3 | 68 | 3.8 | 4.0 | 63 | 3.3 |
| G | 4.3 | 3.9 | 5.8 | 65 | 3.7 | 3.1 | 60 | 3.2 |
| H | 4.4 | 3.9 | 6.3 | 68 | 3.7 | 4.3 | 60 | 3.1 |
| I | 4.1 | 3.9 | 6.3 | 69 | 4.2 | 3.4 | 65 | 3.5 |
| J | 4.5 | 4.0 | 6.0 | 63 | 4.0 | 2.5 | 63 | 3.1 |
| K | 4.3 | 3.6 | 3.8 | 15 | 4.1 | 1.0 | 63 | 3.3 |
| L | 4.4 | 3.8 | 5.9 | 70 | 4.0 | 4.5 | 63 | 3.6 |
| untreated | 4.6 | 4.8 | 0 | 15 | 3.1 | 0 | 15 | 3.3 |

What is claimed is:

1. A process for simultaneously conferring both stain repellency and soil releasing properties on a fabric of natural or synthetic fibers comprising the steps of applying to said fabric and drying thereon a solution or dispersion in aqueous or nonaqueous solvent of hybrid tetracopolymer consisting essentially of 40 to 70% fluoroaliphatic radical containing acrylate or methacrylate, 5 to 15% of an acrylate or methacrylate of alkyl of 1–4 carbon atoms, 20 to 30% polyoxyethylene acrylate or methacrylate and 5 to 15% of an acrylate or methacrylate of polyoxypropylene or polyoxytetramethylene, said solution being applied in an amount sufficient to provide from 0.02 to 1% by weight of carbon-bonded fluorine on said fabric.

2. A fabric of natural or synthetic fibers having a coating comprising a hybrid copolymer consisting essentially of the polymer of 40 to 70% fluoroaliphatic radical containing acrylate or methacrylate, 5 to 15% of an acrylate or methacrylate of alkyl of 1–4 carbon atoms, 20 to 30% polyoxyethylene acrylate or methacrylate and 5 to 15% of an acrylate or methacrylate of polyoxypropylene or polyoxytetramethylene.

3. A fabric of natural or synthetic fibers according to claim 2 having a coating additionally comprising a fluoroaliphatic radical containing polymer devoid of polyoxyalkylene groups.

4. A fabric of natural or synthetic fibers according to claim 2 having a coating additionally comprising an aminoplast crease resistant resin.

* * * * *

UNITED STATES PATENT AND TRADEMARK OFFICE
CERTIFICATE OF CORRECTION

PATENT NO. : 3,995,085
DATED : November 30, 1976
INVENTOR(S) : Joseph Dana McCown Page 1 of 2

It is certified that error appears in the above-identified patent and that said Letters Patent are hereby corrected as shown below:

Column 3, line 42, "perfluromethyl" should read -- perfluoromethyl -- .

Column 4, line 38, "$C_2F_3CF$" should read -- $C_2F_5CF$ -- .

Column 4, line 42, "$C_2F_3CF$" should read -- $C_2F_5CF$ -- .

Column 4, line 45, "$C_2F_3$" should read -- $C_2F_5$ -- .

Column 4, line 47, "$NCF_2CF_2SO_2N(CH_3)CH_2CH_3O_2-CCH=CH_2$" should read -- $NCF_2CF_2SO_2N(CH_3)CH_2CH_2O_2CCH=CH_2$ -- .

Column 4, line 48, "$C_2F_3$" should read -- $C_2F_5$ -- .

Column 5, line 36, "undesirable" should read -- undesirably -- .

Column 7, line 6, "solent" should read -- solvent -- .

Column 7, line 17, "or" should read -- of -- .

Column 8, line 20, "of" should read -- or -- .

Column 8, line 28, "2" should read -- 2% -- .

UNITED STATES PATENT OFFICE
CERTIFICATE OF CORRECTION

Patent No. 3,995,085      Dated November 30, 1976

Inventor(s) Joseph Dana McCown

It is certified that error appears in the above-identified patent and that said Letters Patent are hereby corrected as shown below:

Column 8, line 52, "are", first occurrence, should be deleted.

*Signed and Sealed this*

*Sixth* Day of *September 1977*

[SEAL]

*Attest:*

RUTH C. MASON      LUTRELLE F. PARKER
*Attesting Officer*      *Acting Commissioner of Patents and Trademarks*